Figure 5:
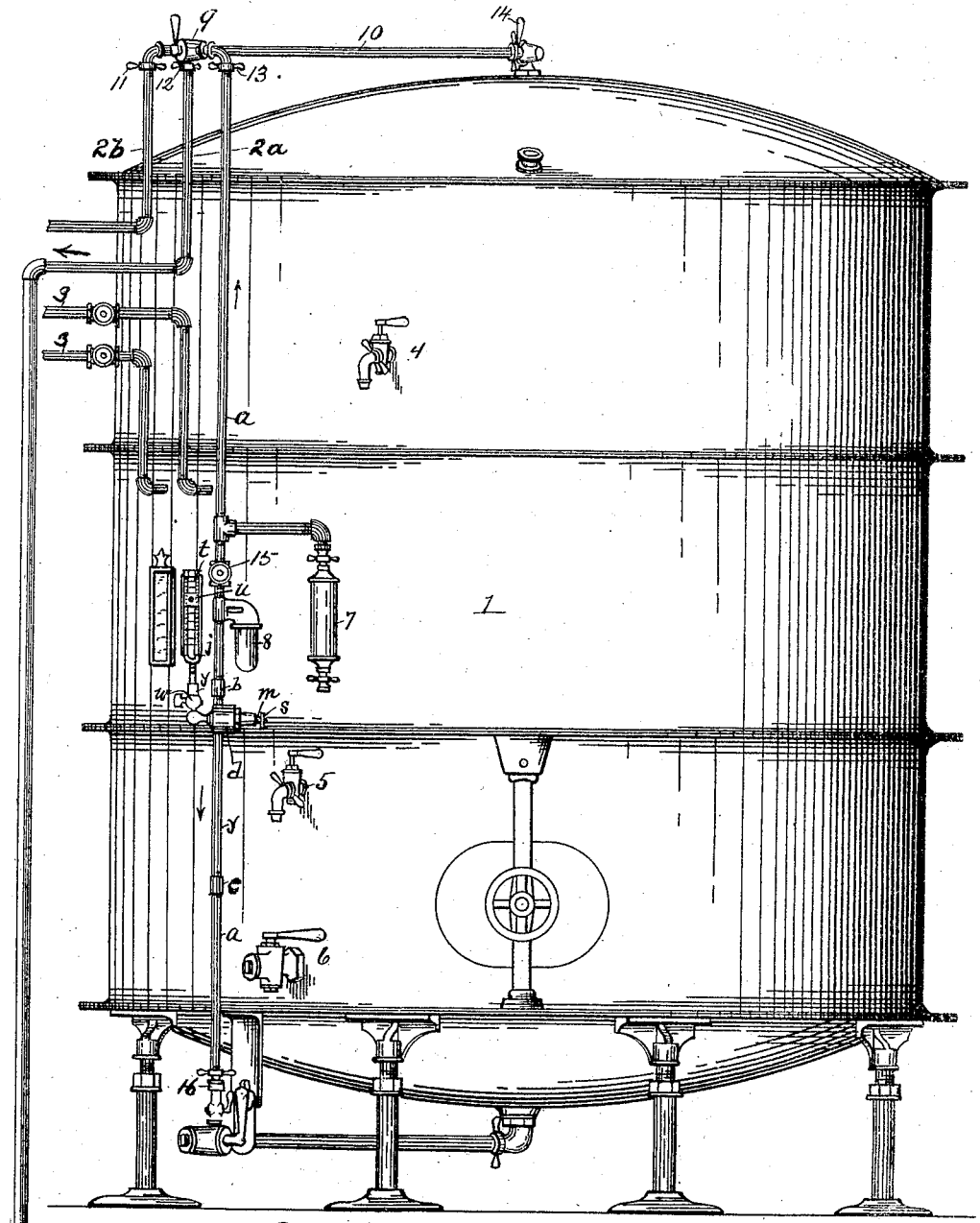

No. 765,549. PATENTED JULY 19, 1904.
F. BROGNIEZ.
MECHANISM FOR REGULATING THE ADMISSION OF AIR TO LIQUIDS.
APPLICATION FILED JUNE 20, 1902.
NO MODEL. 2 SHEETS—SHEET 1.
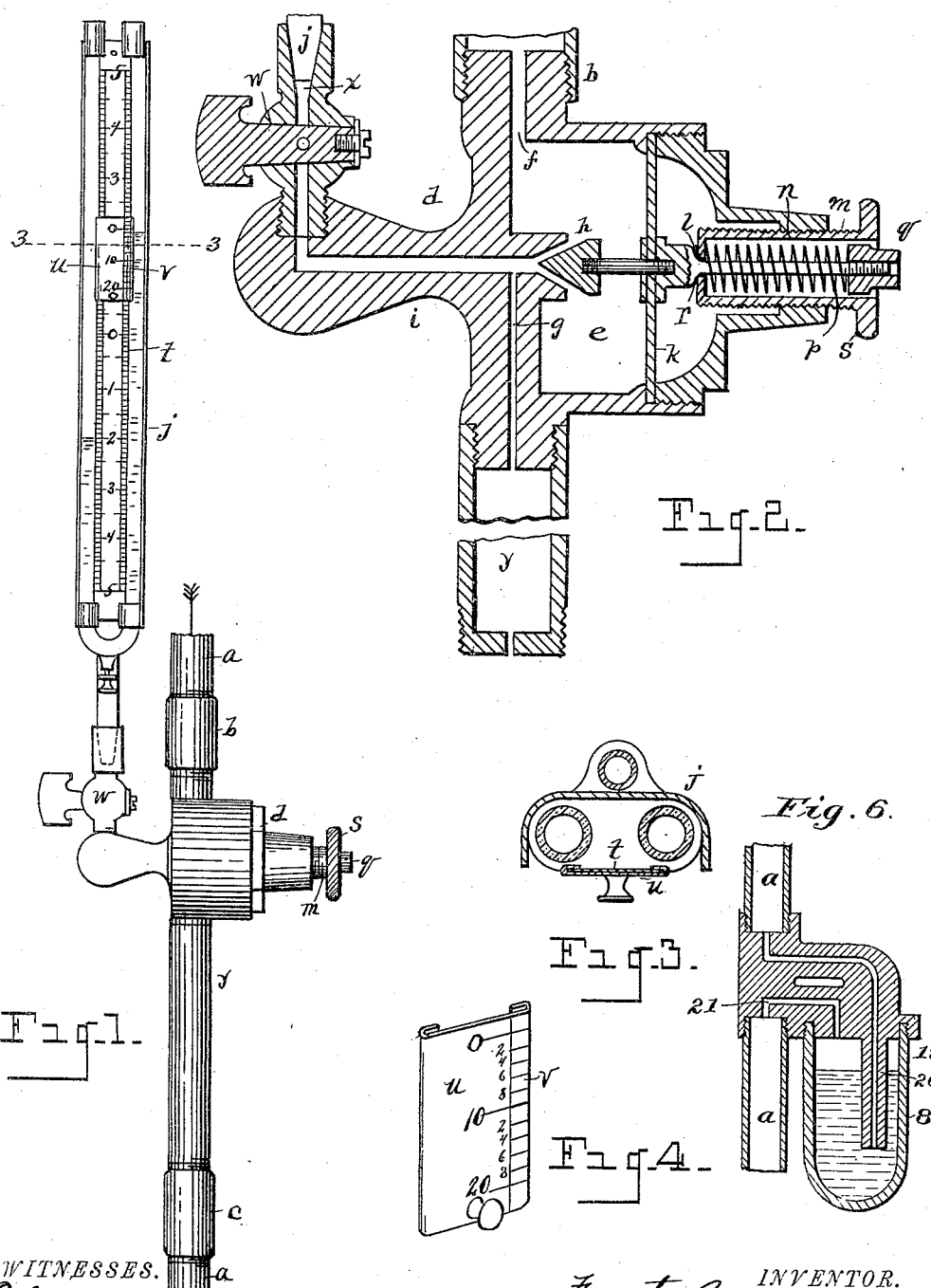
WITNESSES.
O. B. Barnziger
J. M. Poland
INVENTOR.
Frantz Brogniez
By Newell S. Wright
His Attorney No. 765,549. PATENTED JULY 19, 1904.
F. BROGNIEZ.
MECHANISM FOR REGULATING THE ADMISSION OF AIR TO LIQUIDS.
APPLICATION FILED JUNE 20, 1902.
NO MODEL. 2 SHEETS—SHEET 2.

No. 765,549. Patented July 19, 1904.

UNITED STATES PATENT OFFICE.

FRANTZ BROGNIEZ, OF DETROIT, MICHIGAN, ASSIGNOR TO PFAUDLER VACUUM FERMENTATION CO., OF ROCHESTER, NEW YORK, A CORPORATION OF NEW YORK.

MECHANISM FOR REGULATING THE ADMISSION OF AIR TO LIQUIDS.

SPECIFICATION forming part of Letters Patent No. 765,549, dated July 19, 1904.

Application filed June 20, 1902. Serial No. 112,435. (No model.)

*To all whom it may concern:*

Be it known that I, FRANTZ BROGNIEZ, a citizen of the United States, residing at Detroit, county of Wayne, State of Michigan, have invented a certain new and useful Improvement in Mechanism for Regulating the Admission of Air to Liquids, of which the following is a specification, reference being had to the accompanying drawings, which form a part of this specification.

My invention has for its object certain new and useful improvements in mechanism to regulate the admission of air into and through the liquid in a vacuum fermentation apparatus during the process of fermentation to aid and regulate the fermentation of the liquid.

My invention pertains to the well-known vacuum fermentation apparatus; and it consists of the devices and appliances constituting my improved aerating-regulator for regulating the admission of air thereto, as hereinafter described and claimed, and illustrated in the accompanying drawings, in which—

Figure 1 is a view in side elevation. Fig. 2 is a view in vertical section. Fig. 3 is a view in cross-section on the line 3 3, Fig. 1. Fig. 4 is a detail view of the slide upon the vacuum-gage. Fig. 5 is a view in side elevation, showing my aerating-regulator in place in a well-known vacuum fermentation apparatus. Fig. 6 is a vertical section through the air sight-feed.

My present invention embraces features of construction shown and described in a pending application, filed November 22, 1901, Serial No. 83,308, for an aerating-regulator. As therein stated, heretofore in carrying out the process of vacuum fermentation there has been no means provided for properly or automatically regulating the admission of air to the bottom of the tank and through the liquid contained therein during the carrying out of said process. As is well known, the degree of vacuum produced in the tank is not always the same, and the amount of air admitted has therefore been liable to fluctuate as the degree of vacuum fluctuates.

The purpose of my invention is not to regulate the degree of vacuum in the tank, but to provide means to regulate the admission of air to the tank containing the liquid, so as to admit the same amount of air thereinto continuously notwithstanding fluctuations of the vacuum pressure. This regulation may be effected automatically, and it may be effected by suction, although I do not limit myself thereto.

In the accompanying drawings, $a$ $a$ denote portions of an ordinary vacuum suction-pipe customarily employed in connection with other well-known mechanism (illustrated in Fig. 5) in carrying out the vacuum fermentation process. The pipes $a$ $a$ are arranged to communicate with the interior of the tank employed in carrying out said process at the top and at the bottom, the upper portion of the pipe communicating through a pipe 10 with the interior of the tank at the top and the lower portion of the pipe $a$ leading into the bottom of the tank.

The numeral 1 denotes a tank, and $2^a$ $2^b$ branches of the suction-pipe, each leading to any suitable means—as a pump, for example—the one for drawing off the gas forming in the top of the tank after fermentation begins therewithin, the other to produce a desired degree of suction to form more or less of a vacuum in the top of the tank.

The numerals 3 3 represent customary pipes for leading brine through the tank for cooling purposes; 4, a customary overflow-valve; 5, a customary testing-valve, and 6 a racking-valve. Leading into the suction-pipe $a$ $a$ is any ordinary air-filter 7, through which air enters to take the place of the vacuum in the tank. The suction-pipe $a$ $a$ is also usually provided with an ordinary "air sight-feed" 8, communicating therewith, through which the air passes. At the numeral 9 is shown any suitable three-way valve controlling communication between the pipes $a$ $a$, $2^a$, $2^b$, and 10, the pipe 10 leading from the valve 9 into the upper end of the tank. By turning the three-way valve 9 into corresponding position the communication of the pipe 10 may be controlled with either of the pipes $a$ $a$, $2^a$, or $2^b$. Thus when the valve 9 is turned to open communication between the pipes $a\,a$ and 10 communication with the pipes $2^a$ and $2^b$ would be closed. When the valve is turned to close the communication between the pipes $a\,a$ and 10 and the regulating device was wished to be in operation, the valve would open communication between the pipes $2^a$ and 10. The pipes $a\,a$ and $2^a\,2^b$ are provided with couplings 11 12 13 and the pipe 10 with an independent valve 14. Above the air sight-feed the pipe $a\,a$ is provided with a valve 15, said pipe being also provided with a valve 16 near the bottom thereof. The above-named features are of common construction hitherto employed and form in themselves no feature of my present invention. Into this suction-pipe $a\,a$ in common use I connect my improved aerating-regulator, as by pipe connections $b$ and $c$. My aerating-regulator, as already described in the pending application above referred to, consists, essentially, of a valve-case $d$, forming an interior chamber $e$. Into this chamber communicates an inlet-channel $f$ of the case, while an outlet-channel $g$ of the case leads from said chamber, the communication of the outlet being controlled by a valve $h$, seating in said case. The valve-case is also formed with a channeled arm $i$, upon which may be connected any suitable gage $j$ of any common construction for testing the operation of the regulator. Within the chamber $e$ of the valve-case is a flexible diaphragm $k$, with which is engaged in any suitable manner the stem $l$ of the valve. Engaged upon said valve-stem is a thimble or spring-housing $m$, having a threaded engagement with the case, as shown at $n$, the spring $p$ in said thimble being given any desired tension by means of a tension-nut $q$ upon the outer end of the valve-stem. The valve-stem is movable through the inner end of the thimble, as indicated at $r$. The outer end of the thimble is provided with a head $s$ for operating the same. It will be evident that the operation of the valve may be governed by the operation of the thimble, while the valve may also be operated independently of the thimble by the movement of the flexible diaphragm $k$.

Obviously the suction exerted in the channel $g$ will tend to move the flexible diaphragm inward, thereby tending to close the valve. The spring exerts its tension upon the diaphragm in the direction opposite that of the vacuum suction above described, its tension upon the diaphragm being adjusted to resist or equalize the suction to a desirable degree.

It will be seen that when the vacuum suction in the channel $g$ is increased beyond the tension of the spring the valve will tend to close, thereby diminishing the supply of air received by suction, while, on the other hand, when the vacuum suction is diminished in the channel $g$ the spring will open the valve wider to admit more air. The valve $h$ also governs the communication of the channeled arm $i$ with the valve-chamber. The gage $j$ may be any customary siphon-gage provided with the usual scale $t$, as shown. My invention, however, contemplates locating upon the face of the scale in any suitable manner a movable indicator-slide $u$, provided with scale-marks $v$, as shown, arranged to show the reading above and below the zero-line of the scale $t$. I prefer to provide the arm $i$ with a suitable valve or petcock $w$, having a socket $x$ to receive the base of the gage, said base and socket having a ground joint connection; but the gage may be engaged upon said arm in any suitable manner. With the valve-case is preferably connected an expansion or equalizing chamber $y$, into which the channel $g$ communicates. The expansion-chamber tends to overcome or prevent pulsations in the suction-pipe $a\,a$. I do not limit myself to any specific sizes of the channeled parts of the valve-case. By this construction when the vacuum suction is greater than normal no more air is received, and when the suction is less than normal the same amount of air is still supplied. The gage shows the reduction of the vacuum by the inlet of air. It will not be necessary to equip each regulator with a permanent gage, as one gage may answer to test a number of regulators. The sliding scale on the gage is to be set on the point indicating the complete degrees of vacuum produced or the degrees of vacuum produced when no air passes to the liquid.

Obviously no air passes when the valve $h$ is closed. If it is desired to admit a given quantity of air to the liquid—say, for example, two cubic feet per hour—the amount would be governed by adjusting the spring which works against the diaphragm $k$, and whereby more or less air may be admitted, as may be desired. The diaphragm and the spring are normally balanced all the time when the spring is adjusted for a given supply of air, the degree or amount of aeration being indicated by the siphon or vacuum gage. The device requires no further attention after once having been adjusted, as the regulator will keep the same supply of aeration all the time whether the suction rises or falls. It will be obvious that to properly read upon the gage $j$ the amount of aeration going on the degrees of the scale $t$, both above and below the zero-point, to which the mercury rises and falls in the two channels of the gage must be added. Thus if the scale $t$ be divided into inches and tenths of an inch the rising of the mercury in the right-hand channel of the gage one inch would denote a difference of vacuum suction of two inches, as the mercury in the opposite arm would correspondingly drop one inch.

By dividing the scale $v$ on the indicator-slide $u$ to read twice the number of inches or fractions of an inch indicated on the scale $t$ in order to readily observe the amount of aeration going on one needs only to look at the scale on the indicator-slide.

The slide, as already observed, is first to be set at zero, or the position indicated by the mercury when the valve is closed. The valve is then opened to the required amount of aeration desired. The working of the device when once adjusted is obviously automatic. Suction produced in the pipe *a* in any desired manner draws air thereinto, which is led through my improved regulator—as, for example, through the filter 7 and air sight-feed 8. When a given degree of vacuum is wanted in the tank and the regulator is to be in operation, the three-way valve 9 is turned to close the pipe *a*. When the valve 9 is turned to close the pipe *a a* and the regulator is in operation, communication would be opened between the pipes 2ª and 10. It is evident that under these conditions where vacuum-pressure is produced upon the top of the contents of the tank vacuum suction is produced through my improved regulator when the valves 15 and 16 are open, because of the contents of the tank being under vacuum-pressure. The suction of the air entering the regulator will be somewhat reduced by the passage of the air through the filter 7 and through the air sight-feed 8.

The construction and operation of my invention will now be understood.

To recapitulate some of the points already noted, it will be obvious that when the vacuum suction is diminished the air will not be sucked into and through the regulator as rapidly as before, in consequence of which a larger opening of the valve *h* is required to give a uniform air-supply into the bottom of the tank to feed the liquid therewithin. In this case the spring will act upon the diaphragm and open the valve wider. On the other hand, if the vacuum suction is increased the velocity of the air entering and passing through the regulator will be greater, in consequence of which to preserve a uniform air-supply a smaller opening is required from the chamber *e* into the channel *g*, and the increase of the vacuum suction will tend to close the valve *h* to give the smaller opening desired. In this manner a constant and uniform air-supply may be secured, while the vacuum suction may fluctuate. Thus the amount of air supplied into the base of the tank may be made uniform, the vacuum suction and the spring being the two forces to secure the uniform air-supply under various fluctuations of the vacuum suction. It will be noticed that air has heretofore been admitted into the bottom of the tank to aerate the contents of the tank by the outside air being drawn in through the pipes *a a* in consequence of the vacuum suction. The valve 15 being open, the air enters through the filter 7, wherein it has been purified, and passes through the air sight-feed 8, consisting of a "bubble-meter," and passes thence downward into the base of the tank. Heretofore the only means of regulating the amount of air thus supplied was by means of the valve 15; but this did not in any manner constitute an automatic regulation of the air-supply, since the air-supply was continuously fluctuating with fluctuations of the vacuum suction. By inserting, however, into the pipe *a a* below the air sight-feed my automatic regulator I am enabled to secure any given amount of aeration desired, the same being constant under any given adjustment of the spring tension upon the diaphragm of the regulator, no matter what may be the fluctuations of the vacuum-pressure.

The air sight-feed 8 may be of any desired construction, usually consisting of a suitably-shaped glass vessel 19 partially filled with water, in which is extended the lower end of a small pipe 20, communicating with the pipe *a a* at its upper end, an additional small pipe or channel 21 communicating with the interior of the glass vessel at its upper end and leading into the pipe *a a*, as shown in Fig. 6. The air passes through the pipe 20 and through the water in said vessel, causing bubbles to rise, in consequence of which the admission of air through the air sight-feed may be observed. In consequence of the air passing through the filter, and especially through the air sight-feed, the force of the vacuum suction is checked, and in consequence of the sizes of the pipe 20 and the channel 21 of the air sight-feed as customarily made the relative sizes of the channels *f* and *g* of the regulating mechanism *d* is immaterial, the sizes of the pipe 20 and the channel 21 being customarily not greater than the size of the channel *g* of the regulator.

In Fig. 5 I have shown a pump 17 connected with the branch 2ª of the vacuum suction-pipe. After the operation of fermentation has terminated within the tank air is no longer required to be passed through the aerator, nor is there any further occasion for the vacuum within the tank. It will be obvious that by closing the valve 15 and properly opening the valve 9 air will pass through the filter 7 upward through the upper portion of the pipe *a a* and through the pipe 10 into the top of the tank.

What I claim as my invention is—

1. The combination with a fermentation apparatus provided with a tank and with suction mechanism to admit an air-supply into the bottom of the tank, of an automatic regulator interposed in said mechanism to govern the said air-supply, said regulator embodying a valve-case and its valve, a flexible diaphragm within the case engaged with said valve, and a spring to actuate the valve in one direction, said diaphragm actuated by suction in the opposite direction.

2. The combination with a fermentation apparatus provided with a tank and with suction mechanism to admit an air-supply, of an automatic regulator to govern said air-supply, said regulator embodying a valve-case and its valve, a flexible spring-actuated diaphragm within the case engaged with said valve, said diaphragm actuated by suction in the opposite direction, and a gage to test the operation of the regulator, said gage provided with a movable indicator-slide.

3. The combination with a vacuum suction device of a vacuum fermentation apparatus provided with a tank, with a suction-pipe leading into the bottom of the tank, and with means to admit an air-supply into said pipe, of an automatic aerating-regulator interposed in said pipe, embodying a valve-case and its valve and a flexible spring-actuated diaphragm engaged with said valve.

4. The combination with a fermentation apparatus provided with a tank and with suction mechanism to admit an air-supply into the bottom of the tank, of an aerating-regulator constructed with a valve-case forming an interior chamber having outlet and inlet channels communicating therewith, a valve to control the communication of the outlet-channel with said chamber, a flexible diaphragm in said chamber engaged with the stem of the valve, a thimble engaged with the valve-stem and having an adjustable engagement with the valve-case, a spring housed in said thimble, and means to adjust the tension of the spring.

5. The combination with the vacuum suction device of a vacuum fermentation apparatus provided with a suction-pipe and with means to admit an air-supply into said pipe, of an automatic regulator to secure a uniform air-supply to said apparatus, and a testing-gage, said gage provided with a movable indicator-slide.

6. The combination with a fermentation apparatus provided with a tank and with suction mechanism to admit an air-supply into the bottom of the tank, of an aerating-regulator constructed with a valve-case forming an interior chamber having inlet and outlet channels communicating therewith, a valve to control the communication of said chamber with the outlet-channel, a flexible spring-actuated diaphragm in said chamber connected with the stem of said valve, and means to adjust the tension of said spring.

7. The combination with a fermentation apparatus provided with a tank and with suction mechanism to admit air into the bottom of the tank, of an automatic regulator interposed in said mechanism to secure a uniform supply of air admitted into the bottom of the tank and through the liquids into the tank.

8. The combination with a fermentation apparatus provided with a tank and with a suction-pipe communicable with the top and with the bottom of the tank to supply air either into the top or into the bottom of the tank, of means to control the communication of the pipe with the tank, and an automatic regulator interposed into said pipe to secure a uniform supply of air admitted into the bottom of the tank and through the liquid in that tank to aid and regulate the fermentation of the liquid.

9. The combination with a fermentation apparatus provided with a tank and with a suction-pipe open to the atmosphere and communicable with the top and with the bottom of the tank to supply air into either the top or into the bottom of the tank, of means to control the communication of the pipe into the top and into the bottom of the tank, an automatic regulating device interposed into the said pipe between its entrance into the bottom of the tank and its opening to the atmosphere to secure a uniform supply of air admitted into the bottom of the tank, and through the liquid in the tank, to aid and regulate the fermentation of the liquids.

10. The combination with a vacuum suction device of a vacuum fermentation apparatus provided with a tank, with a suction-pipe leading into the bottom of the tank, and with means to admit an air-supply into said pipe, of an automatic aerating-regulator interposed in said pipe, said regulator embodying a valve-case and its valve, and a flexible spring-actuated diaphragm engaged with said valve whereby the diaphragm will be actuated in one direction by suction, and in the opposite direction by the spring, to secure a uniform air-supply into the bottom of the tank under various fluctuations of the vacuum suction both when the vacuum suction is diminished or increased.

In testimony whereof I have signed this specification in the presence of two subscribing witnesses.

FRANTZ BROGNIEZ.

Witnesses:
N. S. WRIGHT,
J. M. POLAND.